United States Patent [19]
Boden et al.

[11] 4,030,637
[45] June 21, 1977

[54] APPARATUS FOR DOSING AND MIXING FLUID REACTANTS

[75] Inventors: Heinrich Boden, Leverkusen; Ulrich Knipp, Schildgen-Nittum, both of Germany

[73] Assignee: Bayer Aktiengesellschaft, Leverkusen, Germany

[22] Filed: Feb. 9, 1976

[21] Appl. No.: 656,234

[30] Foreign Application Priority Data

Mar. 12, 1975 Germany ............................ 2507727

[52] U.S. Cl. ............................. 222/137; 222/145; 222/318; 425/130
[51] Int. Cl.² ........................................... B65D 5/52
[58] Field of Search ................. 222/137, 145, 318; 425/130

[56] References Cited

UNITED STATES PATENTS

| | | | |
|---|---|---|---|
| 2,418,856 | 4/1947 | Stacy | 425/130 X |
| 3,947,175 | 3/1976 | Melcher | 425/130 |

Primary Examiner—Stanley H. Tollberg
Assistant Examiner—Hadd Lane
Attorney, Agent, or Firm—Gene Harsh; Joseph C. Gil

[57] ABSTRACT

This invention relates to an apparatus for dosing and mixing at least two fluid reactants consisting of a dosing unit; a mixing head and conduits connecting the dosing unit and mixing head; characterized in that the housing of the dosing unit and the mixing head together form a rigid block with the conduits connecting the dosing cylinder with the mixing chamber in the form of channels inside the block.

4 Claims, 2 Drawing Figures

APPARATUS FOR DOSING AND MIXING FLUID REACTANTS

BACKGROUND OF THE INVENTION

Dosing apparatus has been described in U.S. Pat. No. 3,901,408 and is used for the volumetric dosing at a predetermined ratio of two components which are introduced as a reaction mixture into a mold through a mixing head.

One of the components may consist, for example, of polyhydroxyl compounds with a molecular weight of 62–10,000 and preferably 62–5000 containing two hydroxyl groups. Examples include polyesters, polyethers, polythioethers, polyacetals, polycarbonates and polyester amides containing at least two, generally 2 to 8, but preferably 2 hydroxyl groups. The other components may consist of aliphatic, cycloaliphatic, araliphatic and aromatic polyisocyanates. Readily available polyisocyanates are preferably used. These include tolylene-2,4-diisocyanate and any mixtures of this diisocyanate with its isomer as well as polyphenyl-polymethylene polyisocyanates.

The apparatus may also be used for so-called two-component resins, such as polyester resins and epoxide resins.

The apparatus is particularly suitable for dosing highly viscous components, even if they contain fillers. This requires high operating pressures, for example from about 20 bar to several thousand bar. At such high pressures, the use of a stretchable conduit system comprising pipes and flexible tubes affects the timing at which the components are injected into the mixing chamber of the mixing head. One of the reactants may therefore enter the mold cavity unmixed with the other component. Faults are thereby produced in the finished molded product.

It is an object of the present invention to provide an apparatus with which molded products can be produced which are free from faults of the type noted above. The apparatus can also be used for dosing highly viscous components at operating pressures which have not hitherto been attained.

DESCRIPTION OF THE INVENTION

Figure 1:
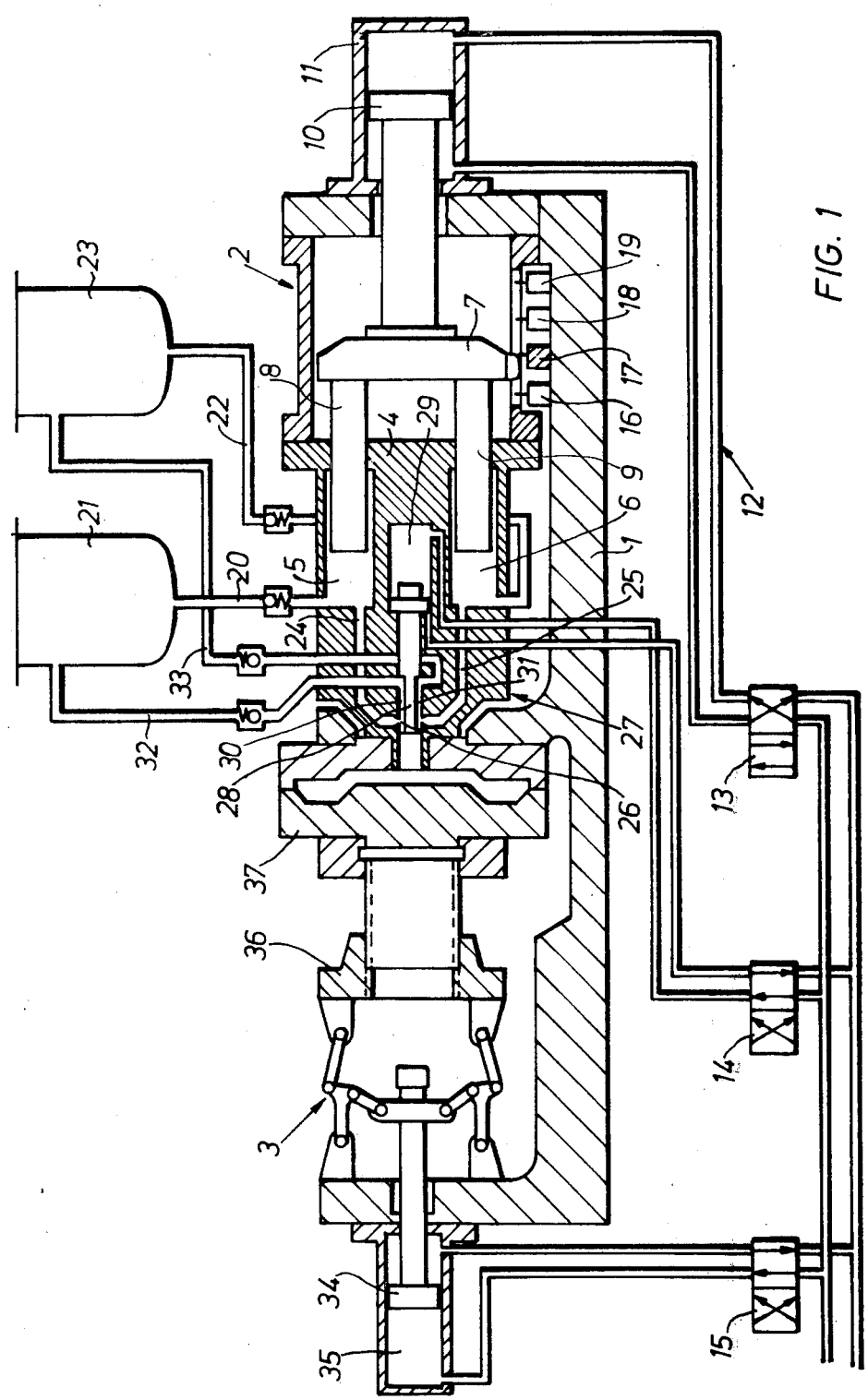
FIG. 1 shows an embodiment of the apparatus in combination with a closure unit.

To solve the aforementioned problems, the instant invention provides for the housing of the dosing unit and the mixing head to form a rigid block with the connecting conduits between the dosing cylinders and mixing chamber consisting of channels inside the block.

This arrangement eliminates the use of pipes and flexible tubes between the dosing device, mixing head and mold, thereby obviating the difficulties arising from the so-called "breathing" of the conduits. The mixing head may be integrally formed with the housing of the dosing device or rigidly attached to it. The bores inside the block provide short connecting paths and by virtue of the stability of the block they undergo no change in volume with changes in pressure. It is therefore possible to deal with reactants at pressure of up to 3000 bar so that the apparatus can be used for components with viscosities of up to 11,000 cP.

The arrangement provides the additional advantage of increased operational safety since all cavities subjected to high pressure are part of the solid housing. If the apparatus is used in conjunction with a differential dosing piston according to U.S. Pat. No. 3,901,408, the ratio in which the two components dosed can be varied stepwise. In addition, the shot weight, that is to say the weight of substance introduced into the mold, can be adjusted accurately to within 10g.

A particular advantage is obtained by using the apparatus of the invention in combination with the closure units of injection molding machines since the extruder part or piston machine part of injection molding machines can be replaced by the apparatus of the invention. Electric and hydraulic control are then carried out in the same way as in the known injection molding machines used for processing thermoplasts and thermosetting plastics. When used in combination with a closure unit, the apparatus of the invention is particularly useful as a dosing and mixing unit because of its compact structure. The apparatus may, of course, also be combined with multi-station closure units which are already known in injection molding machines.

It is also advantageous to combine the apparatus of the invention with an injection molding machine in such a way that an extruder part or a piston machine part can also be alternately used with the closure unit. With this combination it is possible to produce molded products which have a thermosetting plastic or thermoplast covering layer and a cellular core by successively introducing the thermosetting plastic or thermoplast into the mold through the extruder unit while introducing the material which is to form the cellular core through the apparatus of the invention.

Two examples of the apparatus according to the invention are represented diagrammatically in the drawings and described below.

As shown in FIG. 1, the apparatus comprises a machine frame 1 on which a dosing and mixing unit 2 and a mold closure unit 3 are arranged.

The dosing and mixing unit 2 consists of a housing 4 containing cylinder bores 5, 6 associated with dosing pistons 8, 9 which are connected by a yoke 7. The yoke 7 is displaced by a double-action piston 10 which is driven inside a cylinder 11 by a hydraulic control system 12 with conduit valves 13, 14, 15 and an electric control system of which only limit switches, 16, 17, 18 and 19 are shown in the drawings. As is readily apparent, these controls will control the amounts of materials supplied to the mixing head. The electric and hydraulic control system is similar to that used in conventional injection molding machines, with minor modifications to adapt it to the mode of operation of the dosing and mixing unit 2. The cylinder 5 is connected to a storage tank 21 for isocyanate by a pipe 20. The cylinder bore 6 is connected to a storage tank 23 for a polyol by pipe 22. The cylinders 5, 6 communicate with a mixing chamber 26 through channels 24, 25 in the housing 4. The mixing chamber 26 is situated in a mixing head 27 which is integrally formed with the housing 4. The mixing chamber 26 contains an ejecting control member 28 shown in the recycling position comprising a double-action piston which is exposed to pressure on both faces in the hydraulic cylinder 29. The hydraulic system is controlled through the conduit valve 14. Depending on the position of the ejecting control member 28, the components supplied through the channels 24, 25 either enter the mixing chamber 26 or return to the storage tanks 21, 23 through channels 30, 31 of the piston 28 and return ducts 32, 33.

The mold closing unit 3 comprises a double-action piston 34 controlled by the conduit valve 15 and moving inside a hydraulic cylinder 35. The unit comprises a closure mechanism 36 which carries a mold 37 which is shown in the filled position in the drawing.

Figure 2:
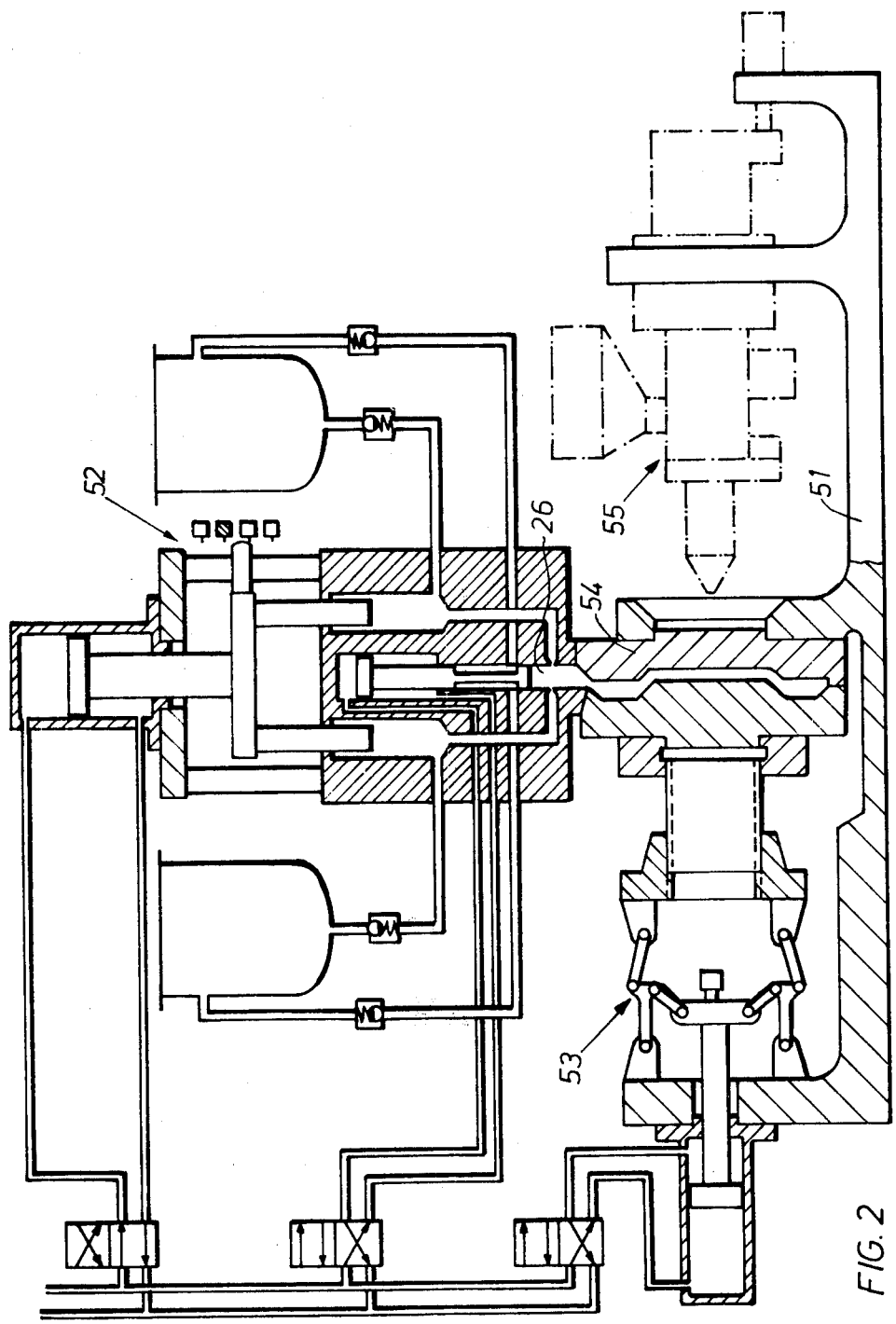
FIG. 2 shows an embodiment of the apparatus in combination with an injection molding machine.

The apparatus shown in FIG. 2 similarly comprises a frame 51, a dosing and mixing unit 52 and a mold closing unit 53. In this case, however, the dosing and mixing unit 52 opens laterally into the mold 54 because a conventional injection molding extruder 55 is additionally provided. The dosing and mixing unit 52 is attached to a conventional machine consisting of an injection molding extruder 55 and a closure unit 53.

What is claimed is:

1. Apparatus for dosing and mixing at least two fluid reactants, comprising
   a. a dosing unit comprising a housing containing dosing cylinders arranged side by side which are connected to storage containers for the reactants through pipes, and a yoke on which dosing pistons corresponding to the cylinders are arranged and which is provided with a drive, and
   b. a mixing head with mixing chamber and outlet aperture, said mixing chamber containing an ejection control member comprising a piston adapted to traverse the mixing chamber so that in a first position said ejection control member allows the reaction components to enter said mixing chamber and in a second position said ejection control member allows the reactants to return to said storage containers, and
   c. conduits connecting the dosing unit to the mixing head characterized in that the housing of the dosing unit and the mixing head together form a rigid block with the conduits connecting the dosing cylinders with the mixing chamber in the form of channels inside this block.

2. The apparatus of claim 1 further provided with a control means for controlling the amounts of material supplied to said mixing head.

3. The apparatus of claim 1 in combination with a closure unit.

4. The apparatus of claim 1 in combination with an injection molding machine and a closure unit.

* * * * *